(12) United States Patent
Shrivastava et al.

(10) Patent No.: US 12,370,867 B2
(45) Date of Patent: Jul. 29, 2025

(54) VEHICLE CONFIGURED TO DETECT LOW REFRIGERANT CHARGE

(71) Applicant: Ford Global Technologies, LLC, Dearborn, MI (US)

(72) Inventors: Rohan Shrivastava, Livonia, MI (US); Changchun Li, Bloomfield Hills, MI (US); Jan Xu, Canton, MI (US); Jennifer Helen Chang, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 17/738,118

(22) Filed: May 6, 2022

(65) Prior Publication Data

US 2023/0356568 A1    Nov. 9, 2023

(51) Int. Cl.
 *B60H 1/32*     (2006.01)
 *B60H 1/00*     (2006.01)

(52) U.S. Cl.
 CPC ....... *B60H 1/3225* (2013.01); *B60H 1/00278* (2013.01); *B60H 1/004* (2013.01); *B60H 1/3205* (2013.01); *B60H 2001/325* (2013.01); *B60H 2001/3272* (2013.01)

(58) Field of Classification Search
 CPC .. B60H 1/3225; B60H 1/00278; B60H 1/004; B60H 1/3205; B60H 2001/325; B60H 2001/3272; F25B 2500/22; F25B 2500/222; F25B 2500/24; F25B 2600/0271; F25B 2600/0272; F25B 2345/003; F25B 2700/1933
 See application file for complete search history.

(56) References Cited

U.S. PATENT DOCUMENTS

| | | | |
|---|---|---|---|
| 5,009,074 A | 4/1991 | Goubeaux et al. | |
| 5,186,014 A | 2/1993 | Runk | |
| 8,151,585 B2 | 4/2012 | Douglas et al. | |
| 10,335,906 B2 | 7/2019 | Pham | |

(Continued)

FOREIGN PATENT DOCUMENTS

| | | | | |
|---|---|---|---|---|
| JP | 2004125215 A | * | 4/2004 | ......... F25B 2400/12 |
| KR | 100315485 B1 | * | 11/2001 | ............. F24F 11/32 |

(Continued)

OTHER PUBLICATIONS

KR-100315485-B1 English Translation (Year: 2001).*
JP-2004125215-A English Translation (Year: 2004).*

*Primary Examiner* — Frantz F Jules
*Assistant Examiner* — Devon Moore
(74) *Attorney, Agent, or Firm* — David B. Kelley; Carlson, Gaskey & Olds, P.C.

(57) ABSTRACT

This disclosure relates to a vehicle configured to detect a low refrigerant charge and a corresponding method. In some aspects, the techniques described herein relate to a vehicle, including: a thermal conditioning system including a compressor and a suction pressure sensor upstream of the compressor; and a controller in communication with the compressor and the suction pressure sensor, wherein the controller is configured to perform a technique to monitor for a low charge condition, and the controller is configured to inhibit a low pressure cutoff when the controller is performing technique.

18 Claims, 3 Drawing Sheets

(56) References Cited

U.S. PATENT DOCUMENTS

2016/0361975 A1* 12/2016 Blatchley .............. B60H 1/3216
2020/0240869 A1* 7/2020 Yesh ........................ G01M 3/38
2022/0274463 A1* 9/2022 Koo ................... B60H 1/00885

FOREIGN PATENT DOCUMENTS

| WO | WO-2013119489 A2 * | 8/2013 | .............. F25B 45/00 |
| WO | WO-2014009732 A1 * | 1/2014 | .............. F25B 49/02 |
| WO | WO-2020051314 A1 * | 3/2020 | ......... B60H 1/00485 |

* cited by examiner

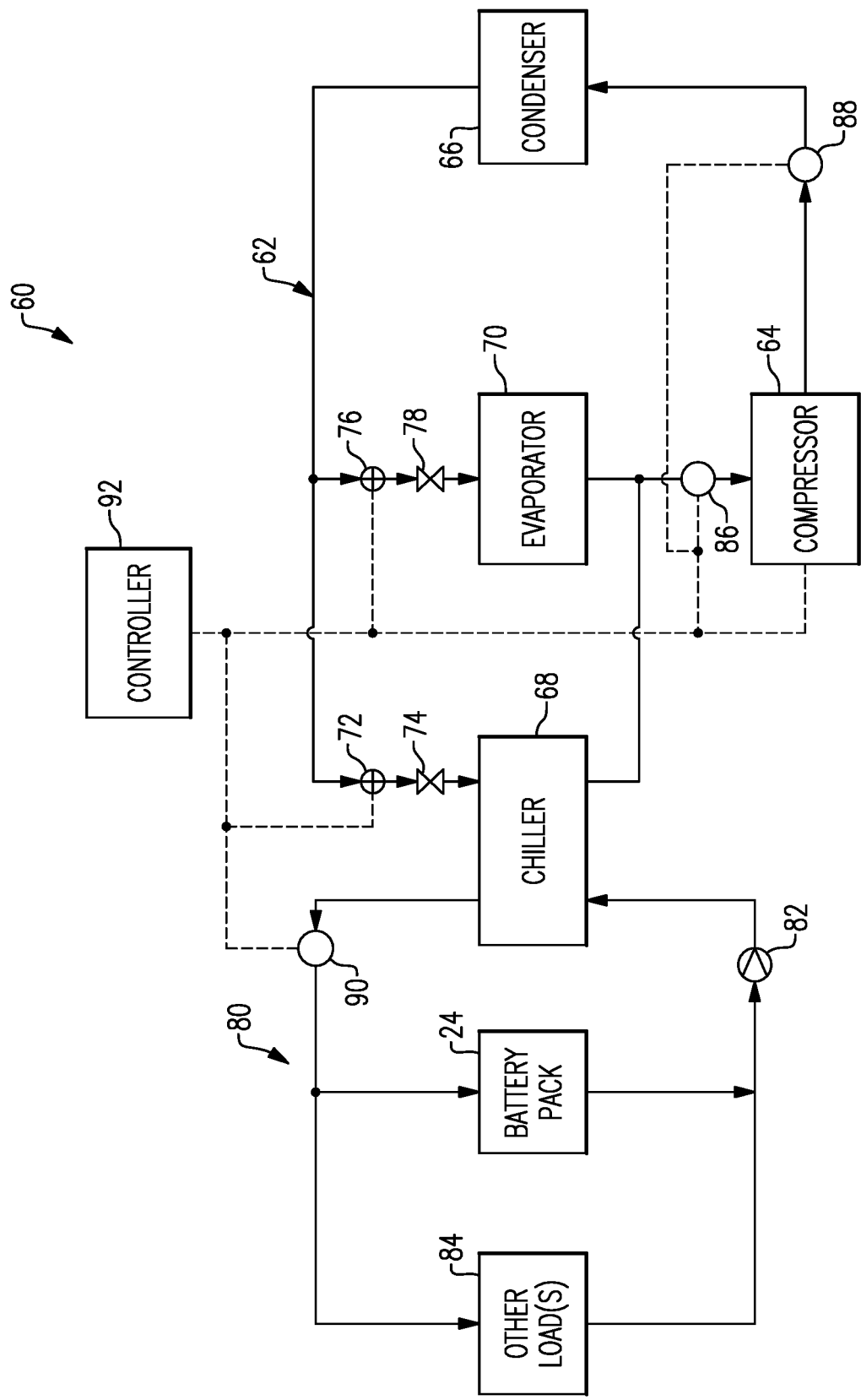

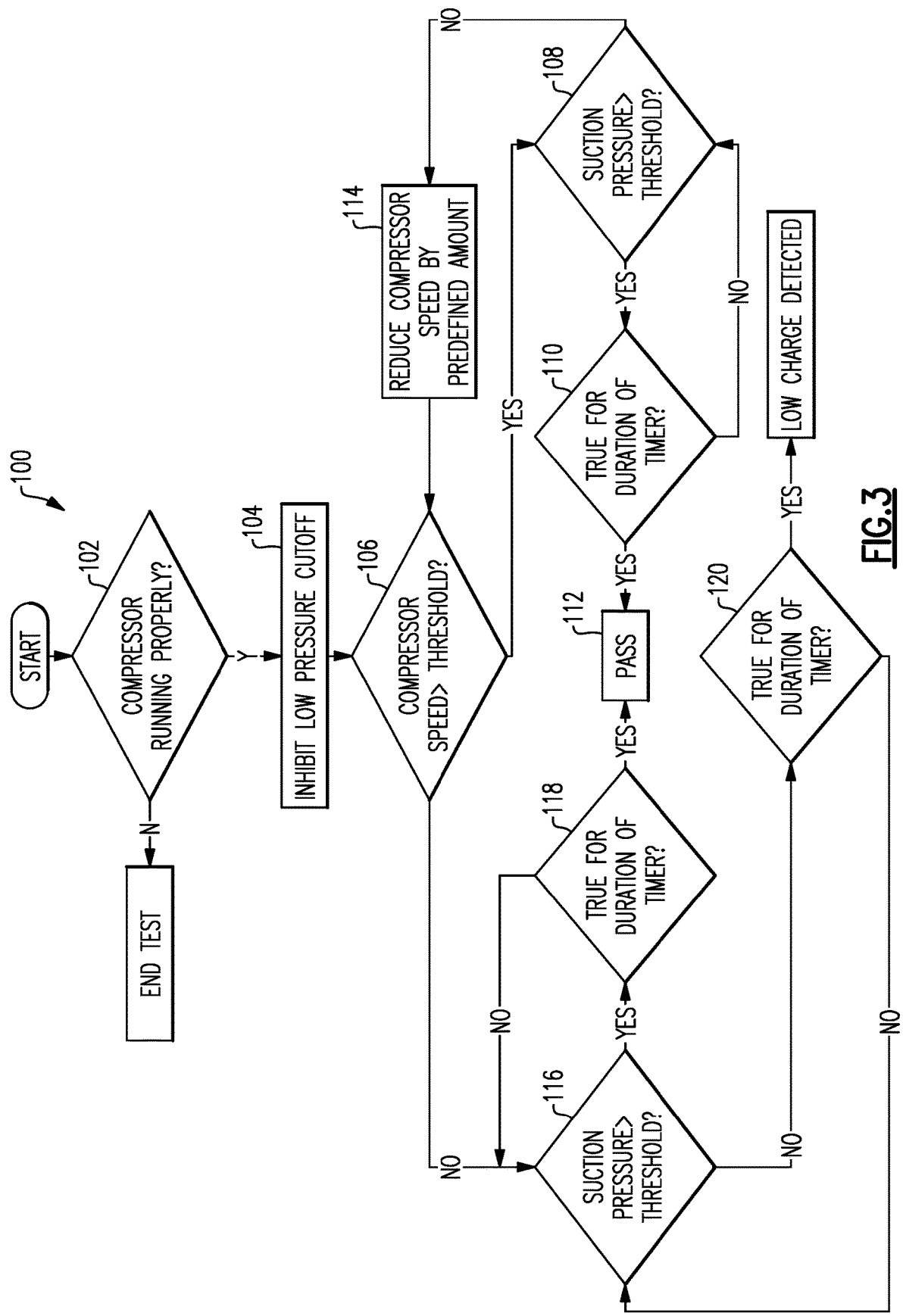

VEHICLE CONFIGURED TO DETECT LOW REFRIGERANT CHARGE

TECHNICAL FIELD

This disclosure relates to a vehicle configured to detect a low refrigerant charge and a corresponding method.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Automatic climate control is increasingly prevalent in motor vehicles today. In such vehicles, a user chooses a temperature setting, and a climate control system works to heat or cool a passenger cabin to meet the thermal conditioning demand. The climate control system may include a refrigerant system having a compressor, condenser, one or more expansion devices, and one or more evaporators. The refrigerant system may also be used to thermally condition a high voltage battery pack, which powers the electric machines and other electrical loads of an electrified vehicle.

SUMMARY

In some aspects, the techniques described herein relate to a vehicle, including: a thermal conditioning system including a compressor and a suction pressure sensor upstream of the compressor; and a controller in communication with the compressor and the suction pressure sensor, wherein the controller is configured to perform a technique to monitor for a low charge condition, and the controller is configured to inhibit a low pressure cutoff when the controller is performing technique.

In some aspects, the techniques described herein relate to a vehicle, wherein: the thermal conditioning system includes a refrigerant loop, and when the controller is not performing the technique, the controller is configured to trigger the low pressure cutoff when a pressure of fluid within the refrigerant loop falls below a threshold.

In some aspects, the techniques described herein relate to a vehicle, wherein: when the controller is performing the technique, the controller is configured to disregard signals from a discharge pressure sensor downstream of the compressor.

In some aspects, the techniques described herein relate to a vehicle, wherein the controller is configured to only identify a low charge condition if the low charge condition is sustained for an entirety of a duration of a timer.

In some aspects, the techniques described herein relate to a vehicle, wherein: if a speed of the compressor is above a threshold, the controller is configured to compare a suction pressure indicated by the suction pressure sensor with a pressure threshold, if the suction pressure is above the pressure threshold, the controller is configured to begin a timer, and if the suction pressure remains above the pressure threshold for an entirety of a duration of the timer, the controller is configured to determine a low charge condition is not present.

In some aspects, the techniques described herein relate to a vehicle, wherein, if the suction pressure falls below the pressure threshold at any point during the duration of the timer, the controller is configured to again compare the suction pressure indicated by the suction pressure sensor with a pressure threshold.

In some aspects, the techniques described herein relate to a vehicle, wherein: if the suction pressure is below the pressure threshold, the controller is configured to reduce the speed of the compressor by a predetermined amount.

In some aspects, the techniques described herein relate to a vehicle, wherein: if a speed of the compressor is below a threshold, the controller is configured to compare a suction pressure indicated by the suction pressure sensor with a pressure threshold, if the suction pressure is above the pressure threshold, the controller is configured to begin a timer, and if the suction pressure remains above the pressure threshold for an entirety of a duration of the timer, the controller is configured to determine a low charge condition is not present.

In some aspects, the techniques described herein relate to a vehicle, wherein: if the suction pressure is below the pressure threshold, the controller begins another timer, and if the suction pressure remains below the pressure threshold for an entirety of a duration of the other timer, the controller is configured to determine a low charge condition is present.

In some aspects, the techniques described herein relate to a vehicle, wherein the timer and the other timer run for the same duration.

In some aspects, the techniques described herein relate to a vehicle, wherein: the thermal conditioning system includes a refrigerant loop, a chiller, and a coolant loop, the refrigerant loop includes a compressor, condenser, evaporator, and an expansion valve, heat is transferred between the refrigerant loop and the coolant loop via the chiller, and the coolant loop is configured to thermally condition a battery pack of the vehicle.

In some aspects, the techniques described herein relate to a vehicle, wherein the vehicle is an electrified vehicle.

In some aspects, the techniques described herein relate to a vehicle, including: a thermal conditioning system including a compressor and a suction pressure sensor upstream of the compressor; and a controller in communication with the compressor and the suction pressure sensor, wherein the controller is configured to perform a technique to monitor for a low charge condition, and the controller is configured to only identify the low charge condition if the low charge condition is sustained for an entirety of a duration of a timer.

In some aspects, the techniques described herein relate to a vehicle, wherein the low charge condition is not identified if, at any point during the duration of the timer, a pressure of fluid within a refrigerant loop exceeds a threshold.

In some aspects, the techniques described herein relate to a vehicle, wherein, when the controller is performing technique, the controller is configured to inhibit a low pressure cutoff of the thermal conditioning system.

In some aspects, the techniques described herein relate to a vehicle, wherein, when the controller is performing the technique, the controller is configured to disregard signals from a discharge pressure sensor downstream of the compressor.

In some aspects, the techniques described herein relate to a method, including: performing a technique to monitor for a low charge condition in a thermal conditioning system of a vehicle; and inhibiting a low pressure cutoff during performance of the technique.

In some aspects, the techniques described herein relate to a method, further including: identifying the low charge condition only if the low charge condition is sustained for an entirety of a duration of a timer.

In some aspects, the techniques described herein relate to a method, wherein the low charge condition is not identified if, at any point during the duration of the timer, a pressure of fluid within a refrigerant loop exceeds a threshold.

In some aspects, the techniques described herein relate to a method, wherein signals from a discharge pressure sensor are disregarded during performance of the technique.

BRIEF DESCRIPTION OF THE DRAWINGS

FIG. 2 schematically illustrates an example refrigerant system.

FIG. 3 is a flow chart representative of an example method.

DETAILED DESCRIPTION

Figure 1:
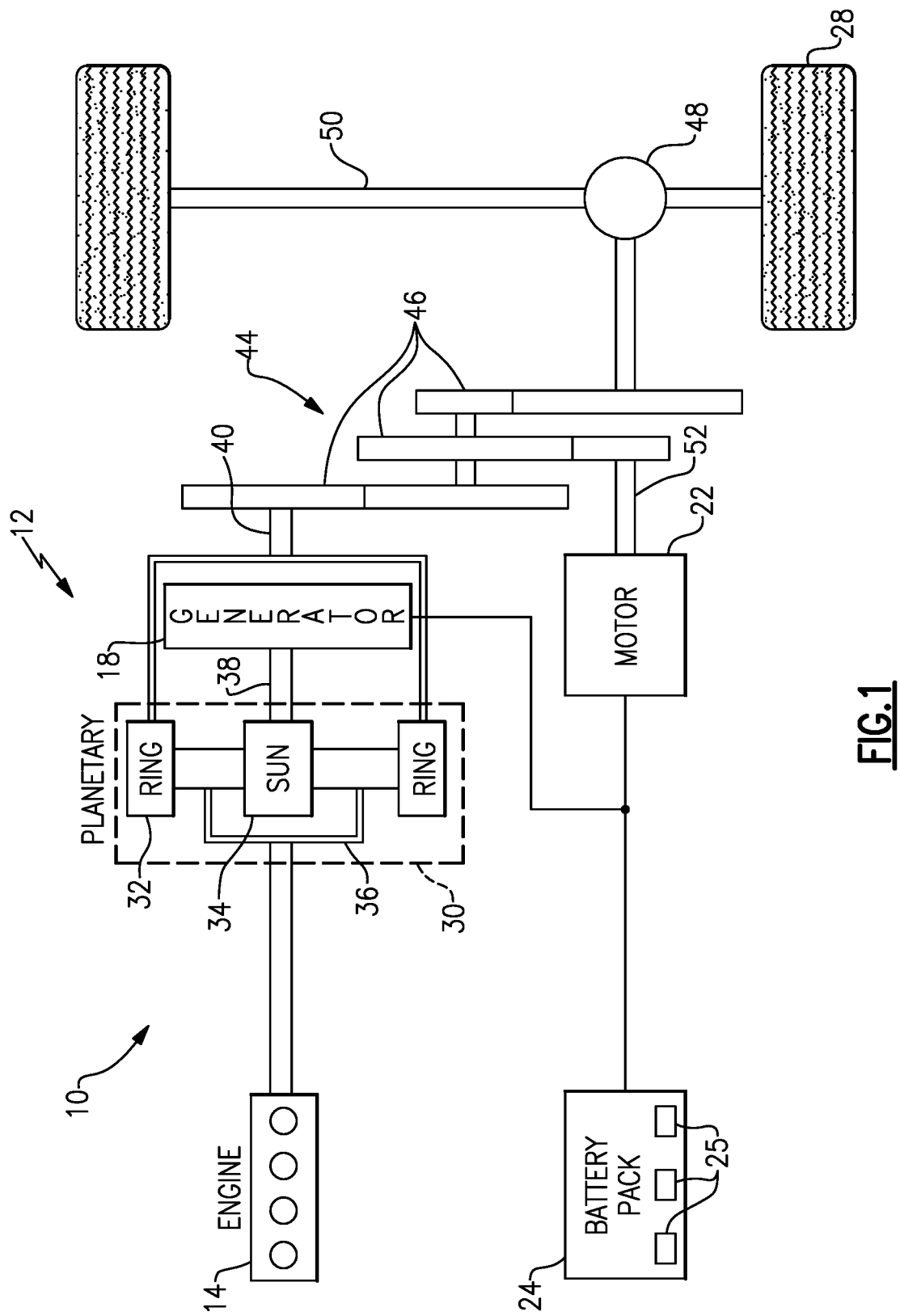
FIG. 1 schematically illustrates a powertrain of an electrified vehicle.

This disclosure relates to a vehicle configured to detect a low refrigerant charge and a corresponding method. This disclosure has a number of benefits which will be appreciated from the following description. Among those benefits, this disclosure is able to reliably identify a low charge condition in various environmental conditions, such as in low temperature conditions.

FIG. 1 schematically illustrates a powertrain 10 for an electrified vehicle 12 ("vehicle 12"). Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs) and fuel cell vehicles (FCVs). This disclosure also extends to various types of hybrid vehicles including full hybrids, parallel hybrids, series hybrids, mild hybrids, micro hybrids, and plug-in hybrids. Further, certain embodiments of this disclosure are not limited to electrified vehicles, and extend to traditional motor vehicles driven solely by an internal combustion engine.

With continued reference to FIG. 1, the example powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more vehicle drive wheels 28 of the vehicle 12.

The engine 14, which in one embodiment is an internal combustion engine, and the generator 18 may be connected through a power transfer unit 30, such as a planetary gear set. Other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the vehicle 12. Other types of energy storage devices and/or output devices could also be used to electrically power the vehicle 12.

In one non-limiting embodiment, the vehicle 12 has two basic operating modes. The vehicle 12 may operate in an electric vehicle (EV) mode where the motor 22 is used (generally without assistance from the engine 14) for vehicle propulsion, thereby depleting the battery pack 24 state of charge (SOC) up to its maximum allowable discharging rate under certain driving patterns/cycles. The EV mode is an example of a charge depleting mode of operation for the vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The vehicle 12 may additionally operate in a hybrid (HEV) mode in which the engine 14 and the motor 22 are both used for vehicle propulsion. The HEV mode is an example of a charge sustaining mode of operation for the vehicle 12. During the HEV mode, the vehicle 12 may reduce the motor 22 propulsion usage in order to maintain the state of charge of the battery pack 24 at a constant or approximately constant level by increasing the engine 14 propulsion. The vehicle 12 may be operated in other operating modes in addition to the EV and HEV modes within the scope of this disclosure.

In addition to the components shown in FIG. 1, the vehicle 12 also includes a thermal conditioning system 60, as shown in FIG. 2. The thermal conditioning system 60 is configured to thermally condition the battery pack 24 and/or to provide part of an overall climate control system configured meet the various thermal conditioning demands of the vehicle 12, such as passenger cabin cooling and heating requests.

In this example, the refrigerant system 60 includes a main loop 62. The main loop 62 includes at least a compressor 64, a condenser 66 downstream of the compressor 64, and a chiller 68 arranged in parallel with an evaporator 70. Upstream of the chiller 68, a chiller shutoff valve 72 and a thermal expansion valve 74 are provided. Upstream of the evaporator 70, an evaporator shutoff valve 76 and a thermal expansion valve 78 are provided. While thermal expansion valves (TXVs) 74, 78 are shown, the thermal conditioning system 60 could include electronic expansion valves (EEVs or EXVs). The compressor 64 is configured to circulate fluid, such as refrigerant, within the main loop 62 within various passageways of the main loop 62.

A coolant loop 80 is in thermal communication with the chiller 68, in this example. The coolant loop 80 includes a pump 82 and one or more valves configured to direct fluid, such as coolant, within the coolant loop 80 to one or more loads. In this example, a first load is the battery pack 24. Additional loads 84 are arranged in parallel with the battery pack 24. Exemplary additional loads include the climate control system of the passenger cabin of the vehicle 12. The chiller 68 is configured to exchange heat between the coolant loop 80 and the refrigerant loop 62.

The thermal conditioning system 60 includes a plurality of sensors. Among them, a suction pressure sensor 86 is upstream of the compressor 64, and a discharge pressure sensor 88 is downstream of the compressor 64. Further, a temperature sensor may be placed upstream of the compressor 64, adjacent the suction pressure sensor 86. Alternatively, a single sensor may be provided in place of the suction pressure sensor 86 and that single sensor may generate signals indicative of both temperature and pressure. The coolant loop 80 includes a temperature sensor 90 downstream of the chiller 68.

Each of the aforementioned sensors is in electronic communication with a controller 92. The controller 92 is configured to interpret signals generated by the sensors 86, 88, 90 as pressures and/or temperatures, as appropriate. The controller 92 is further configured to interpret the received information and issue instructions (i.e., commands) to various components of the thermal conditioning system 60 based on that information. The controller 92 is also in communication with the compressor 64 and may also be in communication with various thermal control devices of the vehicle 12, such as fan(s) and/or active grille shutters, if present on the vehicle 12.

The controller 92 is shown schematically in FIG. 2. The controller 92 is electrically connected to the various valves and sensors of the thermal conditioning system 60. The controller 92 could be part of an overall vehicle control unit, such as a vehicle system controller (VSC), or could alternatively be a stand-alone control unit separate from the VSC, such as a battery control module. The controller 92 includes a combination of hardware and software, and includes various inputs and outputs for interfacing with the various components of the thermal conditioning system 60. The controller 92 additionally includes a processing unit and non-transitory memory for executing the various control strategies and modes of the thermal conditioning system 60. Although it is shown as a single device, the controller 92 may include multiple controllers in the form of multiple hardware devices, or multiple software controllers within one or more hardware devices. A controller area network (CAN) or local interconnect network (LIN), represented by the dashed lines in FIG. 2, allows the controller 92 to communicate with the various components of the thermal conditioning system 60.

One factor in the performance of the thermal conditioning system 60 is the charge of the refrigerant loop 62. As is known in the art, the term "charge" as in the charge of the refrigerant loop 62 refers to the quantity of fluid, which here is refrigerant, in the refrigerant loop 62. If the charge of the refrigerant loop 62 is above or below a predefined range corresponding to efficient operation of the refrigerant loop 62, the thermal conditioning system 60 may not work as expected and in particular may not be able to effectively thermally condition the loads, such as the battery pack 24. This disclosure relates to a technique for identifying low charge conditions. The technique is robust and works effectively in various types of environmental conditions, such as low temperature conditions.

FIG. 3 illustrates a flow chart representative of an example method 100. The method 100 provides a technique for identifying low charge conditions of the refrigerant loop 62. It should be understood that various steps are performed by the controller 92 based on inputs from the various sensors and/or other components of the thermal conditioning system 60.

In the method 100, the compressor 64 has started and is running. The compressor 64 may be running in order to meet a cooling request of the battery pack 24 and/or the climate control system of the vehicle 12, as examples.

At 102, the controller 92 determines whether the compressor 64 is functioning properly, such as by performing a test to determine whether a motor of the compressor 64 is functioning properly. Further, at 102, the controller 92 may additionally determine whether the sensors 86 and/or 88 are functioning properly.

If these tests are passed, then the controller 92 proceeds with attempting to identify a low charge condition. At 104, the controller 92 inhibits a low pressure cutoff corresponding to the refrigerant loop 62. In particular, because the method 100 involves identifying a potential low charge condition by running the compressor 64 at relatively slow speeds, such speeds may result in low refrigerant pressure within the refrigerant loop 62. During normal operating of the refrigerant loop, such as when the technique associated with the method 100 is not being performed, the controller 92 may identify a low pressure condition and command the thermal conditioning system 60 to cease operating if the pressure falls below a certain, predefined threshold value. In the method 100, however, the controller 92 overrides this low pressure cutoff and permits operation at relatively low pressures which may have otherwise triggered a cutoff. In this way, the behavior of the compressor 64 at slow speeds, and the corresponding reaction of the refrigerant loop 62, can be monitored. In a particular example, during the method 100, the controller 92 does not consider, and effectively ignores or disregards, signals from the discharge pressure sensor 88, whereas during normal operation the controller 92 would use information from the discharge pressure sensor 88 to determine the pressure of the refrigerant within the refrigerant loop 62, and to determine whether to cease operation of the thermal conditioning system 60 if the pressure falls below a predefined threshold value, as mentioned.

At 106, the controller 92 determines whether the speed of the compressor 64 is above a threshold speed. The threshold speed is a predefined speed corresponding to a speed at which the charge of the refrigerant loop 62 can be adequately monitored. In this disclosure, the threshold speed is a relatively slow speed. The threshold speed, in one example, corresponds to a refrigerant pressure that would trigger a low pressure cutoff, discussed above, in normal operating conditions, such as when the method 100 is not being performed.

If the speed of the compressor 64 is above the threshold, then at 108 the controller 92 determines whether the suction pressure is above a predefined threshold. When the suction pressure is above the predefined threshold, a low charge is not present. If the suction pressure is above the predefined threshold, in this disclosure, at 110, a timer is run. During the timer, the controller 92 determines whether the suction pressure remains above the predefined threshold for the duration of the timer. The timer may be a predefined time, such as 10 seconds. For the duration of the timer, the controller 92 will only achieve a "pass" result at, 112, meaning there is no low charge condition present, if the suction pressure remains above the threshold of step 108 for the entirety of the timer. If the suction pressure falls below the threshold at any point during the timer, the controller 92 will return to step 108. By running the timer of 110, the effect of momentary behaviors of the thermal conditioning system 60 is minimized and a more accurate determination is made.

If, at 108, the suction pressure is less than the threshold, the controller 92 will reduce the speed of the compressor 64 by a predefined amount, such as 500 RPM, at 114. The controller 92 then returns to step 106. If, at 106, the speed of the compressor 64 falls below the threshold, the controller 92 next determines whether the suction pressure is greater than a threshold, at 116. The threshold used at step 116 may be the same threshold used in step 108. If the answer to step 116 is yes, then a timer is run at step 118, and, similar to the timer 110, the controller 92 will only achieve a "pass" result if the suction pressure remains above the threshold for the entire duration of the timer, which may be of the same length as the timer of step 110.

If the suction pressure is less than the threshold at 116, the controller 92 will run another timer, at 120. If the suction pressure remains below the threshold for the entirety of the duration of the timer, then the controller 92 will detect a low charge condition. Otherwise, if the suction pressure rises above the threshold at any point during the timer of 120, the controller 92 will return to step 116. The timer of 120 may be of the same length as the timers of 110 and 118. Again, the timers of 110, 118, and 120 ensure that momentary behaviors of the thermal conditioning system 60 do not result in inaccurate determinations as to the true state of the thermal conditioning system 60. Rather, the controller 92 uses the timers to ensure that the disclosed technique monitors for sustained behaviors and conditions of the thermal conditioning system 60.

While several example arrangements have been described, this disclosure extends to other, differently-arranged refrigerant systems. To this end, as one would appreciate, the thermal conditioning system 60 includes a number of ducts, fans, valves, etc., which are not shown in FIG. 2.

Further, the compressor 64 may be any known type of compressor, including a scroll compressor, centrifugal compressor, variable displacement compressor, etc., configured to increase the pressure of a flow of fluid within the refrigerant loop 62. The fluid within the refrigerant loop 62 may include a mixture of oil and refrigerant, which is sometimes called a lubricant-refrigerant mixture, a lubricant-refrigerant blend, or a blended refrigerant. An example fluid F is a blended refrigerant known as R-410a. This disclosure extends to other fluids, such as other refrigerants and blended refrigerants, however.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising:
a thermal conditioning system including a compressor and a suction pressure sensor upstream of the compressor; and
a controller in communication with the compressor and the suction pressure sensor, wherein the controller is configured to perform a technique to monitor for a low charge condition, wherein the controller is configured to inhibit a low pressure cutoff when the controller is performing the technique, wherein the controller is configured to perform the technique while the compressor is running, and wherein the controller is configured to inhibit the low pressure cutoff only after the controller has first determined that the compressor is functioning properly.

2. The vehicle as recited in claim 1, wherein:
the thermal conditioning system includes a refrigerant loop, and
when the controller is not performing the technique, the controller is configured to trigger the low pressure cutoff when a pressure of fluid within the refrigerant loop falls below a threshold.

3. The vehicle as recited in claim 1, wherein:
when the controller is performing the technique, the controller is configured to disregard signals from a discharge pressure sensor downstream of the compressor.

4. The vehicle as recited in claim 1, wherein the controller is configured to only identify the low charge condition if the low charge condition is sustained for an entirety of a duration of a timer.

5. The vehicle as recited in claim 1, wherein:
if a speed of the compressor is above a threshold,
the controller is configured to compare a suction pressure indicated by the suction pressure sensor with a pressure threshold,
if the suction pressure is above the pressure threshold, the controller is configured to begin a timer, and
if the suction pressure remains above the pressure threshold for an entirety of a duration of the timer, the controller is configured to determine the low charge condition is not present.

6. The vehicle as recited in claim 1, wherein:
if a speed of the compressor is below a threshold,
the controller is configured to compare a suction pressure indicated by the suction pressure sensor with a pressure threshold, if the suction pressure is above the pressure threshold, the controller is configured to begin a timer, and if the suction pressure remains above the pressure threshold for an entirety of a duration of the timer, the controller is configured to determine the low charge condition is not present.

7. The vehicle as recited in claim 1, wherein:

the thermal conditioning system includes a refrigerant loop, a chiller, and a coolant loop, the refrigerant loop includes the compressor, a condenser, an evaporator, and an expansion valve, heat is transferred between the refrigerant loop and the coolant loop via the chiller, and the coolant loop is configured to thermally condition a battery pack of the vehicle.

8. The vehicle as recited in claim 1, wherein the vehicle is an electrified vehicle.

9. The vehicle as recited in claim 1, wherein the controller is configured to test a motor of the compressor or a sensor of the thermal conditioning system in order to determine that the compressor is functioning properly.

10. The vehicle as recited in claim 1, wherein the controller is configured such that the technique is initiated after the compressor has started and is running in order to meet a cooling request of one or both of a battery pack of the vehicle or a climate control system of the vehicle.

11. The vehicle as recited in claim 1, wherein, when the technique is initiated, the compressor is able to meet a cooling request of one or both of a battery pack of the vehicle or a climate control system of the vehicle.

12. The vehicle as recited in claim 5, wherein, if the suction pressure falls below the pressure threshold at any point during the duration of the timer, the controller is configured to again compare the suction pressure indicated by the suction pressure sensor with the pressure threshold.

13. The vehicle as recited in claim 5, wherein:

if the suction pressure is below the pressure threshold, the controller is configured to reduce the speed of the compressor by a predetermined amount.

14. The vehicle as recited in claim 6, wherein:

if the suction pressure is below the pressure threshold, the controller begins another timer, and if the suction pressure remains below the pressure threshold for an entirety of a duration of the other timer, the controller is configured to determine the low charge condition is present.

15. The vehicle as recited in claim 14, wherein the timer and the other timer run for the same duration.

16. A method, comprising:

performing a technique to monitor for a low charge condition in a thermal conditioning system of a vehicle, wherein the thermal conditioning system includes a compressor, wherein the compressor is running during performance of the technique;

performing a test of a functionality of the compressor; and inhibiting a low pressure cutoff during performance of the technique only if the test indicates the compressor is functioning properly.

17. The method as recited in claim 16, further comprising:

identifying the low charge condition only if the low charge condition is sustained for an entirety of a duration of a timer.

18. The method as recited in claim 17, wherein the low charge condition is not identified if, at any point during the duration of the timer, a pressure of fluid within a refrigerant loop exceeds a threshold.

* * * * *